(12) United States Patent
Moriya et al.

(10) Patent No.: US 8,576,142 B2
(45) Date of Patent: Nov. 5, 2013

(54) DISPLAY DEVICE AND CONTROL METHOD THEREFOR

(75) Inventors: Akihisa Moriya, Tokyo (JP); Hiroaki Nakamura, Kanagawa (JP); Takashi Sasaki, Kanagawa (JP); Aira Hotta, Kanagawa (JP); Haruhiko Okumura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/420,147

(22) Filed: Mar. 14, 2012

(65) Prior Publication Data

US 2012/0169591 A1 Jul. 5, 2012

Related U.S. Application Data

(63) Continuation of application No. PCT/JP2009/004584, filed on Sep. 15, 2009.

(51) Int. Cl.
*G09G 5/00* (2006.01)

(52) U.S. Cl.
USPC ............... 345/7; 340/425.5; 345/32; 348/46; 348/115; 359/630

(58) Field of Classification Search
USPC .................... 345/165, 7–8, 32; 359/629–633; 340/425.5, 436; 348/46, 115
See application file for complete search history.

(56) References Cited

U.S. PATENT DOCUMENTS

| | | | |
|---|---|---|---|
| 5,850,290 A | | 12/1998 | Horiguchi et al. |
| 6,580,562 B2 * | | 6/2003 | Aoki et al. ............... 359/630 |
| 2004/0080467 A1 * | | 4/2004 | Chinthammit et al. ....... 345/7 |
| 2008/0158096 A1 * | | 7/2008 | Breed ........................... 345/7 |
| 2008/0218870 A1 * | | 9/2008 | Lind et al. .................. 359/630 |
| 2009/0135374 A1 | | 5/2009 | Horiuchi et al. |
| 2009/0153962 A1 | | 6/2009 | Okada et al. |
| 2009/0201225 A1 | | 8/2009 | Okada et al. |
| 2009/0237803 A1 | | 9/2009 | Hotta et al. |
| 2009/0243963 A1 | | 10/2009 | Hotta et al. |
| 2009/0244702 A1 | | 10/2009 | Okada et al. |
| 2010/0073579 A1 | | 3/2010 | Okada et al. |

(Continued)

FOREIGN PATENT DOCUMENTS

| | | |
|---|---|---|
| JP | 61-133436 | 8/1986 |
| JP | 10-122850 | 5/1998 |

(Continued)

OTHER PUBLICATIONS

International Search Report for International Application No. PCT/JP2009/004585 mailed on Jan. 12, 2010.

(Continued)

*Primary Examiner* — Abbas Abdulselam
*Assistant Examiner* — Gloryvid Figueroa-Gibson
(74) *Attorney, Agent, or Firm* — Turocy & Watson, LLP

(57) ABSTRACT

One embodiment provides a display device, including: a luminous flux generator which generates luminous flux including image information; a reflector plate which reflects the luminous flux generated by the luminous flux generator toward one eye of a viewer; a head detector which detects a head of the viewer by using at least two pairs of distance sensors; a controller which controls a position of the reflector plate based on an output from the head detector; and a driver which drives the reflector plate based on an output from the controller.

10 Claims, 5 Drawing Sheets

(56) References Cited

U.S. PATENT DOCUMENTS

| | | |
|---|---|---|
| 2010/0073636 A1 | 3/2010 | Sasaki et al. |
| 2010/0073773 A1 | 3/2010 | Hotta et al. |
| 2010/0079910 A1 | 4/2010 | Tomizawa et al. |
| 2010/0157430 A1 | 6/2010 | Hotta et al. |
| 2011/0001639 A1 | 1/2011 | Sasaki et al. |

FOREIGN PATENT DOCUMENTS

| | | |
|---|---|---|
| JP | 2001-116841 | 4/2001 |
| JP | 2003-341383 | 12/2003 |
| JP | 2009-128565 | 6/2009 |
| JP | 2009-163084 | 7/2009 |

OTHER PUBLICATIONS

Written Opinion for International Application No. PCT/JP2009/004585.

* cited by examiner

FIG. 2A
FIG. 2B
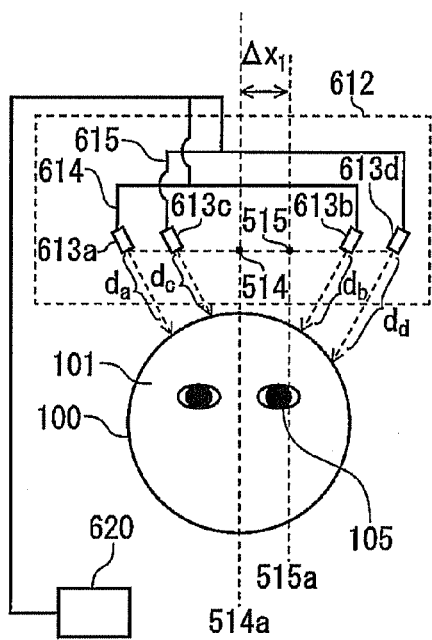
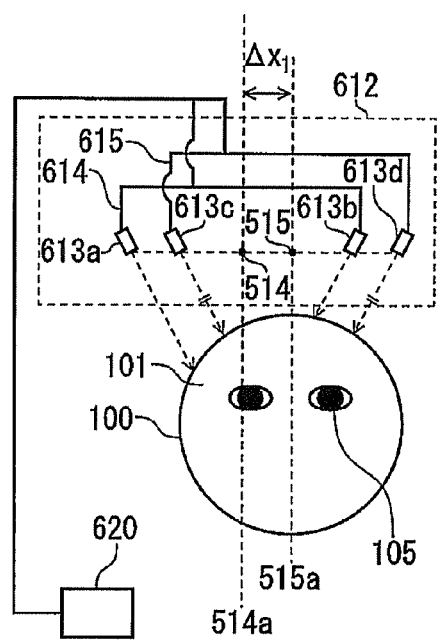

DISPLAY DEVICE AND CONTROL METHOD THEREFOR

CROSS-REFERENCE TO RELATED APPLICATION(S)

This is a Continuation Application of PCT Application No. PCT/JP09/004585, filed on Sep. 15, 2009, which was published under PCT Article 21(2) in Japanese, the entire contents of which are incorporated herein by reference.

FIELD

Embodiments described herein relate generally to a display device and a control method therefor.

BACKGROUND

As an in-vehicle display device, there is a monocular head-up display (HUD) by which driving information such as a vehicle velocity, a movement direction, etc. can be recognized visually.

In such an HUD, a viewer's eye position is derived from a photographic image of a viewer's head. The angle and position of a flat mirror are controlled automatically based on a result of the derivation. Video is presented to one eye of a viewer following the motion of the viewer's head.

In such display device, video cannot be presented to one eye of a viewer robustly because the influence of external light or the like may make it difficult to derive the position of the viewer's eye from a photographic image.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

FIG. 2 partially illustrates the display device according to FIG. 1.

DETAILED DESCRIPTION

In general, one embodiment provides a display device, including: a luminous flux generator which generates luminous flux including image information; a reflector plate which reflects the luminous flux generated by the luminous flux generator toward one eye of a viewer; a head detector which detects a head of the viewer by using at least two pairs of distance sensors; a controller which controls a position of the reflector plate based on an output from the head detector; and a driver which drives the reflector plate based on an output from the controller, wherein the head detector includes: a first pair of distance sensors for measuring a position of the head of the viewer; and a second pair of distance sensors for determining a coefficient used for measurement based on the first pair of distance sensors.

Embodiments will be described below with reference to the drawings.

In this specification and the respective drawings, the same numerals are given for the same parts, and redundant description thereof will be omitted suitably.

Embodiment 1

Figure 1:
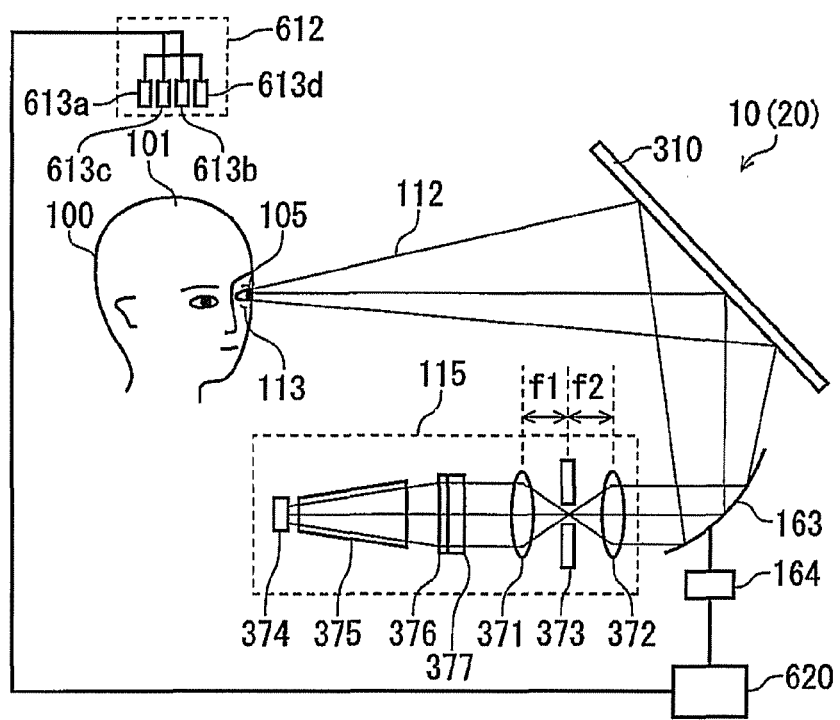
FIG. 1 illustrates a display device according to Embodiment 1.

FIG. 1 illustrates a display device according to Embodiment 1. For example, driving information such as velocity of a vehicle, navigation information, etc. is presented for a viewer 100.

The display device 10 has a luminous flux generator 115, a reflector plate 163, a head detector 612, a controller 620, and a driver 164.

The luminous flux generator 115 generates luminous flux 112 including image information of driving information. The reflector plate 163 reflects the luminous flux 112 generated by the luminous flux generator 115 toward a transparent plate 310 (e.g. a windscreen, a windshield or the like). The transparent plate 310 reflects the luminous flux 112 toward one eye 105 of the viewer 100.

The luminous flux generator 115 includes a light source 374, a limiter 375, a diffuser 376, an image device 377, a first lens 371, an aperture member 373, and a second lens 372. When the focal length of the first lens 371 is $f_1$ and the focal length of the second lens 372 is $f_2$, the aperture member 373 is disposed in a position $f_1$ distant from the first lens 371 and $f_2$ distant from the second lens 372.

The luminous flux 112 outputted from the light source 374 is inputted to the image device 377 including the diffuser 376 while the direction of movement of the luminous flux 112 is limited by the limiter 375 so that the luminous flux 112 will go toward the reflector plate 163. The diffuser 376 permits the luminous flux 112 to be inputted to the image device 377 evenly.

The luminous flux 112 including image information via the image device 377 passes through the first lens 371, the aperture member 373 and the second lens 372. The luminous flux 112 is inputted to the reflector plate 163 while the angle of divergence (the angle at which the luminous flux 112 is diffused) is controlled.

Because the image device 377 is nearer to the light source 374 than to the aperture member 373, the transmittance of the luminous flux 112 through the image device 377 can be made high compared with the case where the aperture member 373 is nearer to the light source 374 than to the image device 377.

A light-emitting diode, a high-pressure mercury lamp, a halogen lamp, a laser or the like is used as the light source 374. A tapered light guide is used as the limiter 375. A diffusion filter or a diffusion plate is used as the diffuser 376. A liquid crystal display, a digital mirror device or the like is used as the image device 377.

The display device 10 projects the luminous flux 112 in such a projection range 113 as including the eye 105 of the viewer 100. The controller 620 controls the direction or position of the reflector plate 163 to adjust the position of projection of the luminous flux 112 so that the luminous flux 112 can be projected within the projection range 113. The viewer 100 can recognize visually the luminous flux 112 with the eye 105. The display device 10 can be used as an HUD.

The head detector 612 uses two pairs of distance sensors 613 for detecting a relative distance between each distance sensor and the head 101 of the viewer 100.

The controller 620 controls the reflector plate 163 to adjust the position of projection of the luminous flux 112 based on output signals from the distance sensor pairs 613 provided in the head detector 612.

The head detector 612 will be described with reference to FIG. 2.

As shown in FIG. 2, the head detector 612 in the display device 10 according to Embodiment 1 has: a first distance sensor pair 614 which has a distance sensor 613a and a distance sensor 613b; and a second distance sensor pair 615 which has a distance sensor 613c and a distance sensor 613d.

Each distance sensor has a light-emitting element, and a light-receiving element. The light-emitting element emits light, so that reflected light returned from the head 101 (eye 105) of the viewer 100 is received by the light-receiving element.

Besides a PSD sensor, a sensor capable of contactlessly measuring the distance to a target, such as a laser displacement meter, an ultrasonic distance sensor, etc., is included in the distance sensor.

A midpoint of a segment connecting the distance sensor 613a and the distance sensor 613b is defined as a first midpoint 514. A midpoint of a segment connecting the distance sensor 613c and the distance sensor 613d is defined as a second midpoint 515.

The segment connecting the distance sensor 613a and the distance sensor 613b is defined as a segment connecting the light-receiving element of the distance sensor 613a and the light-receiving element of the distance sensor 613b.

The segment connecting the distance sensor 613c and the distance sensor 613d is defined as a segment connecting the light-receiving element of the distance sensor 613c and the light-receiving element of the distance sensor 613d.

A bisector perpendicular to the segment connecting the distance sensor 613a and the distance sensor 613b is defined as a first line 514a. A bisector perpendicular to the segment connecting the distance sensor 613c and the distance sensor 613d is defined as a second line 515a.

The distance sensor 613a and the distance sensor 613b are disposed so that light emitted from the distance sensor 613a and light emitted from the distance sensor 613b intersect each other on the first line 514a.

It is desirable that the distance sensor 613a and the distance sensor 613b are disposed so that light is emitted toward a barycentric position in the case where the geometrical barycenter of the head 101 of the viewer 100 is located on the first line 514a.

The distance sensor 613c and the distance sensor 613d are disposed so that light emitted from the distance sensor 613c and light emitted from the distance sensor 613d intersect each other on the second line 515a.

It is desirable that the distance sensor 613c and the distance sensor 613d are disposed so that light is emitted toward a barycentric position in the case where the geometrical barycenter of the head 101 of the viewer 100 is located on the second line 515a.

For example, in an in-vehicle display device, the distance sensor pairs 614 and 615 are disposed on the ceiling.

The first distance sensor pair 614 and the second distance sensor pair 615 are disposed separately so that the distance between the first midpoint 514 and the second midpoint 515 is $\Delta x_1$.

It is desirable that the first distance sensor pair 614 and the second distance sensor pair 615 are disposed on the same line. However, the first distance sensor pair 614 and the second distance sensor pair 615 may be disposed in any positions as long as a first coefficient $G_1$, which will be described later, can be obtained. For example, the second distance sensor pair 615 may be disposed in a position farther from the viewer 100 compared with the first distance sensor pair 614.

The head detector 612 outputs an output voltage value $V_a$ of the distance sensor 613a, an output voltage value $V_b$ of the distance sensor 613b, an output voltage value $V_c$ of the distance sensor 613c and an output voltage value $V_d$ of the distance sensor 613d to the controller 620. The output voltage values $V_a$ to $V_d$ are values according to the relative distances from the distance sensors 613a to 613d to the head 101 of the viewer 100. The output voltage values $V_a$ to $V_d$ correspond to $d_a$ to $d_d$ in FIG. 2. Each of $d_a$ to $d_d$ is a relative distance from the light-receiving element of each distance sensor to the scalp of the head 101 of the viewer 100.

The controller 620 calculates posAB by using expression 1 based on the output voltage value $V_a$ of the distance sensor 613a and the output voltage value $V_b$ of the distance sensor 613b. posAB is a value corresponding to the difference between the relative distance from the distance sensor 613a to the head 101 of the viewer 100 and the relative distance from the distance sensor 613b to the head 101 of the viewer 100.

The controller 620 calculates posCD by using expression 2 based on the output voltage value V, of the distance sensor 613c and the output voltage value $V_d$ of the distance sensor 613d. posCD is a value corresponding to the difference between the relative distance from the distance sensor 613c to the head 101 of the viewer 100 and the relative distance from the distance sensor 613d to the head 101 of the viewer 100.

[Numeral 1]

$$posAB = \frac{V_a - V_b}{V_a + V_b} \quad \text{(Expression 1)}$$

$$posCD = \frac{V_c - V_d}{V_c + V_d} \quad \text{(Expression 2)}$$

FIGS. 2(*a*) and 2(*b*) are views showing a state where posAB is calculated by use of the distance sensor 613a and the distance sensor 613b and posCD is calculated by use of the distance sensor 613c and the distance sensor 613d.

FIG. 2(*a*) shows the position of the head 101 of the viewer 100 at a certain time. FIG. 2(*b*) shows the position of the head 101 of the viewer 100 at a time different from that in FIG. 2(*a*). In FIG. 2(*b*), the head 101 of the viewer 100 is located in a position satisfying posCD=0.

The controller 620 calculates the value (posAB1) of posAB in accordance with the expression 1 when the value of posCD is a value equal to zero, and determines a first coefficient $G_1$ in accordance with expression 3.

[Numeral 2]

$$G_1 = \frac{\Delta x_1}{posAB_1} \quad \text{(Expression 3)}$$

The first coefficient $G_1$ is a coefficient used for obtaining the relative position $Est_1$ of the head 101 of the viewer 100.

The value equal to zero is a value including noise in the output signals from the distance sensors and an error range due to the shape of the head 101 of the viewer 100, etc. That is, a numerical value which is not strictly zero but settled in a specific error range is defined as the value equal to zero.

The controller 620 calculates $Est_1$ in accordance with expression 4. $Est_1$ is an estimated value corresponding to the relative distance between the geometrical barycenter of the head 101 of the viewer 100 and the first line 514a.

[Numeral 3]

$$Est_1 = G_1 \times posAB = G_1 \frac{V_a - V_b}{V_a + V_b} \quad \text{(Expression 4)}$$

The viewer 100 initializes the setting of the display device 10 in a state where the head 101 is located in the position satisfying posAB=0 (state of FIG. 2(a)). On this occasion, the viewer 100 adjusts the position of the reflector plate 163 so that the projection range 113 of the luminous flux 112 includes one eye 105 of the viewer 100.

The position of the eye 105 of the viewer 100 in this state is defined as a reference position.

The position of the reflector plate 163 includes a position due to translational motion, and an angular position due to rotary motion.

The controller 620 calculates Est1 while the display device 10 is used. The controller 620 gives an instruction (outputs a signal) to the driver 164 to move the projection range 113 of the luminous flux 112 by the distance of $Est_1$ from the reference position on a direction along the segment connecting the first midpoint 514 and the second midpoint 515. Upon reception of this instruction, the driver 164 drives the reflector plate 163.

For example, when the calculation result is $Est_1$=+5, the controller 620 gives an instruction to the driver 164 to move the projection range 113 of the luminous flux 112 by 5 cm from the reference position in a direction of movement from the second midpoint 515 toward the first midpoint 514 to thereby adjust the position of the reflector plate. Upon reception of this instruction, the driver 164 drives the reflector plate 163.

In this manner, the display device 10 according to Embodiment 1 can be provided as a display device which can follow the position of one eye of the viewer without the necessity of high-grade image processing capacity. And, video can be presented to one eye of the viewer robustly without any influence of external light or the like.

Figure 3:
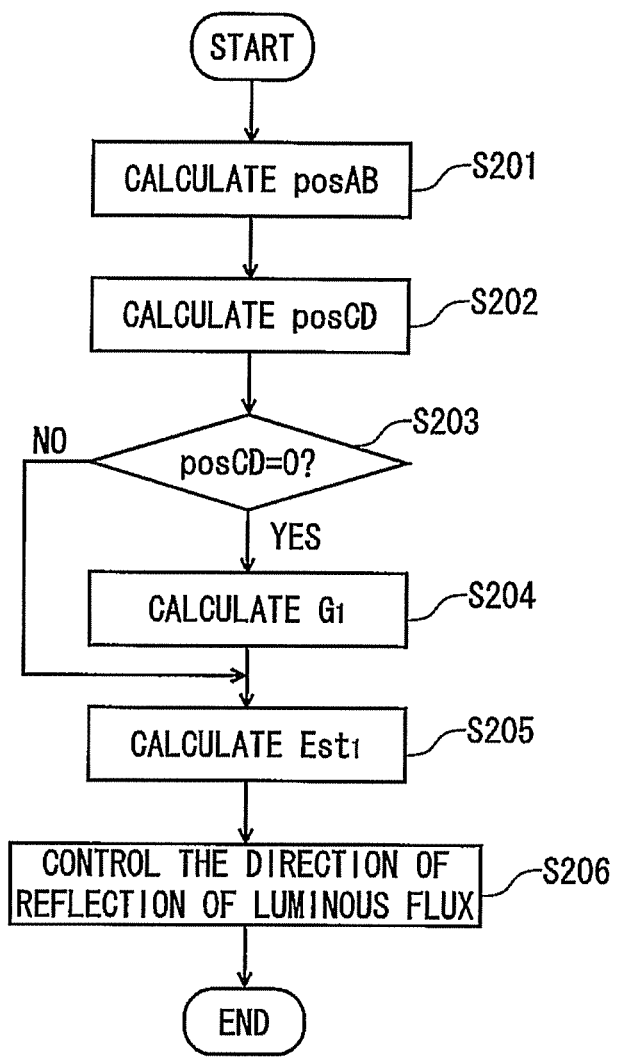
FIG. 3 illustrates a method for controlling the display device of FIG. 1.

FIG. 3 illustrates a control method of the display device according to Embodiment 1. The control method shown in FIG. 3 starts at a state where an initial value of $G_1$ is given to the controller 620 in advance in the manufacturing stage of the display device 10. Or the control method starts at a state where the viewer 100 first moves the head 101 to a position satisfying posCD=0 and makes the controller 620 calculate an initial value of $G_1$ at the time of start of use of the display device 10.

As shown in FIG. 3, in the control method of the display device 10 according to Embodiment 1, posAB is calculated according to the expression 1 by using the output voltage value of the distance sensor 613a and the output voltage value of the distance sensor 613b (step S201). And, posCD is calculated according to the expression 2 by using the output voltage value of the distance sensor 613c and the output voltage value of the distance sensor 613d (step S202). The step S201 and the step S202 are repeated in accordance with sampling time. The step S201 and the step S202 may be in random order.

Then, determination is made as to whether the value of posCD is a value equal to zero or not (step S203). When determination is made that the value of posCD is a value equal to zero, the first coefficient $G_1$ is calculated according to the expression 3 (step S204). And, $Est_1$ is calculated according to the expression 4 (step S205).

When determination is made that the value of posCD is not a value equal to zero, the step S205 is executed by using the initial value or previously calculated value of $G_1$ without interposition of the step S204.

Successively, the direction of reflection of the luminous flux 112 is controlled based on a result of the step S205.

According to this method, the processing step of converting each output voltage value into the distance to the head 101 of the viewer 100 can be omitted so that processing cost can be reduced. Because the position of the head 101 of the viewer 100 is determined according to the expression 4, measurement can be performed without correction due to temperature, individual difference, etc. so that robustness is improved.

Embodiment 2

Figure 4:
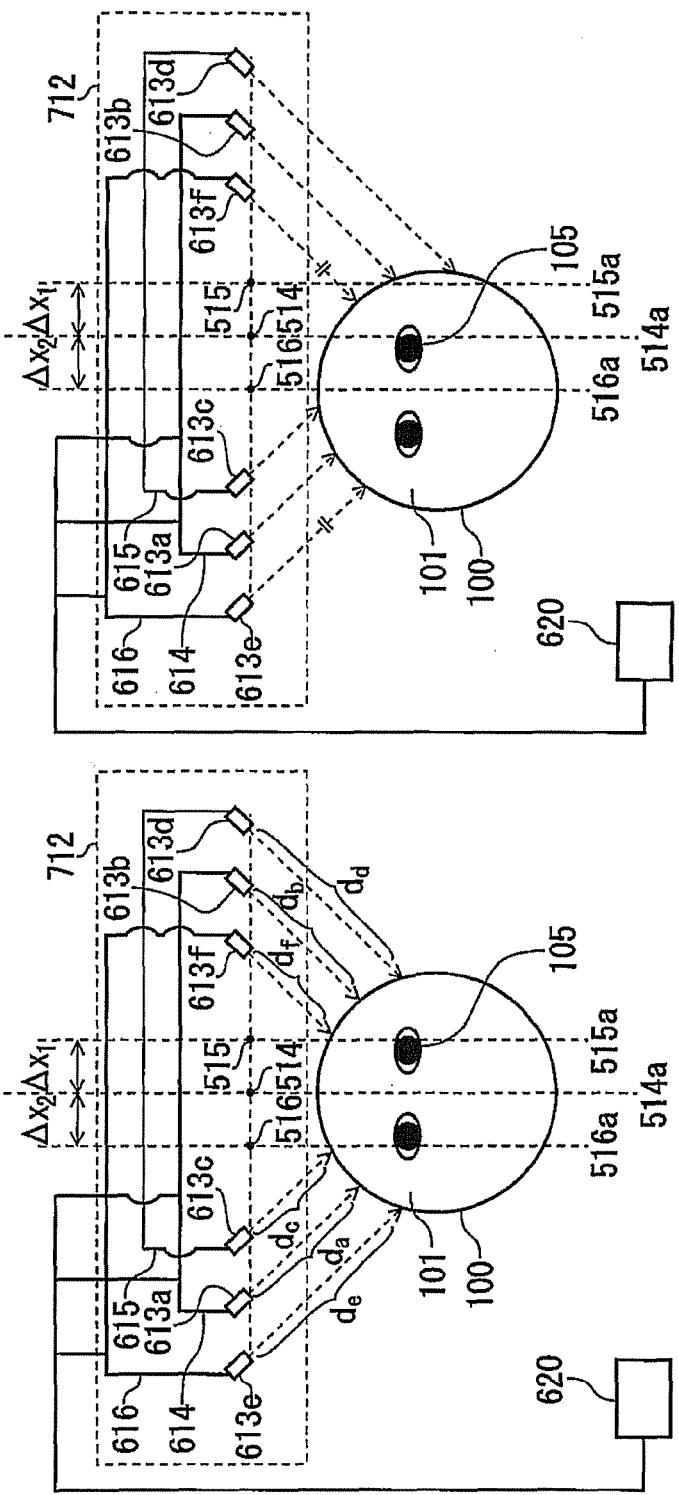
FIG. 4 partially illustrates a display device according to Embodiment 2.

FIG. 4 partially illustrates a display device according to Embodiment 2.

The display device 20 is a display device having a head detector 712 by which the head detector 612 in the display device 10 illustrated in FIG. 2 is replaced.

The head detector 712 further has a third distance sensor pair 616 having a distance sensor 613e and a distance sensor 613f in addition to the head detector 612.

Each of the distance sensor 613e and the distance sensor 613f has a light-emitting element and a light-receiving element like Embodiment 1.

A midpoint of a segment connecting the distance sensor 613e and the distance sensor 613f is defined as a third midpoint 516. The third midpoint 516 is located opposite to the second midpoint 515 with respect to the first midpoint 514.

The segment connecting the distance sensor 613e and the distance sensor 613f is defined as a segment connecting the light-receiving element of the distance sensor 613e and the light-receiving element of the distance sensor 613f.

A bisector perpendicular to the segment connecting the distance sensor 613e and the distance sensor 613f is defined as a third line 516a.

The distance sensor 613e and the distance sensor 613f are disposed so that light emitted from the distance sensor 613e and light emitted from the distance sensor 613f intersect each other on the third line 516a.

It is desirable that the distance sensor 613e and the distance sensor 613f are disposed so that light is emitted toward a barycentric position in the case where the geometrical barycenter of the head 101 of the viewer 100 is located on the third line 516a.

The first distance sensor pair 614 and the third distance sensor pair 616 are disposed separately so that the distance between the first midpoint 514 and the third midpoint 516 is $\Delta x_2$.

The first distance sensor pair 614 and the third distance sensor pair 616 need not be disposed on the same line. Like Embodiment 1, the first distance sensor pair 614 and the third distance sensor pair 616 may be disposed as long as a second coefficient $G_2$, which will be described later, can be obtained.

The head detector 712 outputs an output voltage value $V_a$ of the distance sensor 613a, an output voltage value $V_b$ of the distance sensor 613b, an output voltage value $V_c$ of the distance sensor 613c, an output voltage value $V_d$ of the distance sensor 613d, an output voltage value $V_e$ of the distance sensor 613e and an output voltage value $V_f$ of the distance sensor 613f to the controller 620. The output voltage values $V_a$ to $V_f$ are values corresponding to the relative distances from the distance sensors 613a to 613f to the head 101 of the viewer 100.

The controller 620 calculates posEF by using the expression 5 based on the output voltage value $V_e$ of the distance sensor 613e and the output voltage value $V_f$ of the distance sensor 613f in addition to posAB and posCD.

[Numeral 4]

$$posEF = \frac{V_e - V_f}{V_e + V_f} \qquad \text{(Expression 5)}$$

posEF is a value corresponding to the difference between the relative distance from the distance sensor 613e to the head 101 of the viewer 100 and the relative distance from the distance sensor 613f to the head 101 of the viewer 100.

The output voltage values $V_e$ and $V_f$ correspond to $d_e$ to $d_f$ in FIG. 4. Each of $d_e$ and $d_f$ is a relative distance from the light-receiving element of each distance sensor to the scalp of the head 101 of the viewer 100.

FIGS. 4(a) and 4(b) are views showing a state where posAB is calculated by use of the distance sensor 613a and the distance sensor 613b, posCD is calculated by use of the distance sensor 613c and the distance sensor 613d, and posEF is calculated by use of the distance sensor 613e and the distance sensor 613f. FIG. 4(a) shows the position of the head 101 of the viewer 100 at a certain time. FIG. 4(b) shows the position of the head 101 of the viewer 100 at a time different from that in FIG. 4(a). In FIG. 4(b), the head 101 of the viewer 100 is located in a position satisfying posEF=0.

In addition to the first coefficient $G_1$, the controller 620 calculates the value (posAB2) of posAB in accordance with the expression 1 when the value of posEF is a value equal to zero, and determines a second coefficient $G_2$ in accordance with the expression 6.

[Numeral 5]

$$G_2 = \frac{\Delta x_2}{posAB_2} \qquad \text{(Expression 6)}$$

The second coefficient $G_2$ is a coefficient used for obtaining the relative position $Est_2$ of the head 101 of the viewer 100.

The viewer 100 initializes the setting of the display device 10 in a state where the head 101 is located in the position satisfying posAB=0 (state of FIG. 4(a)). On this occasion, the viewer 100 adjusts the direction or position of the reflector plate 163 so that the projection range 113 of the luminous flux 112 includes one eye 105 of the viewer 100 (like Embodiment 1). The position of the eye 105 of the viewer 100 in this state is defined as a reference position.

The controller 620 calculates $Est_1$ in accordance with the expression 4 and controls the reflector plate 163 (like Embodiment 1) in the case where the head 101 of the viewer 100 is on the right side of the first midpoint 514 in FIG. 4 (on the side of movement from the first midpoint 514 toward the second midpoint 515).

The controller 620 gives an instruction to the driver 164 to move the projection range 113 of the luminous flux 112 by the distance of $Est_1$ from the reference position on a direction along the segment connecting the first midpoint 514 and the second midpoint 515. Upon reception of this instruction, the driver 164 drives the reflector plate 163.

The controller 620 calculates $Est_2$ in accordance with the expression 7 in the case where the head 101 of the viewer 100 is on the left side of the first midpoint 514 in FIG. 4 (on the side of movement from the first midpoint 514 toward the third midpoint 516). $Est_2$ is an estimated value corresponding to the relative distance between the geometrical barycenter of the head 101 of the viewer 100 and the first line 514a.

The controller 620 gives an instruction to the driver 164 to move the projection range 113 of the luminous flux 112 by the distance of $Est_2$ from the reference position on a direction along the segment connecting the first midpoint 514 and the third midpoint 516. Upon reception of this instruction, the driver 164 drives the reflector plate 163.

[Numeral 6]

$$Est_2 = G_2 \times posAB = G_2 \frac{V_a - V_b}{V_a + V_b} \qquad \text{(Expression 7)}$$

For example, when the calculation result is $Est_2 = -10$, the controller 620 gives an instruction to the driver 164 to move the projection range 113 of the luminous flux 112 by 10 cm from the reference position in a direction of movement from the third midpoint 516 toward the first midpoint 514 to thereby adjust the direction of the reflector plate. Upon reception of this instruction, the driver 164 drives the reflector plate 163.

In this manner, the display device 20 according to Embodiment 2 can be provided as a display device which can follow the position of one eye of the viewer without the necessity of high-grade image processing capacity. And, video can be presented to one eye of the viewer robustly without any influence of external light or the like.

Because the head detector 712 further has the third distance sensor pair 616 having the distance sensor 613e and the distance sensor 613f in addition to the head detector 612, the head detector 712 can measure the position of the head 101 of the viewer 100 with higher accuracy than the head detector 612.

Figure 5:
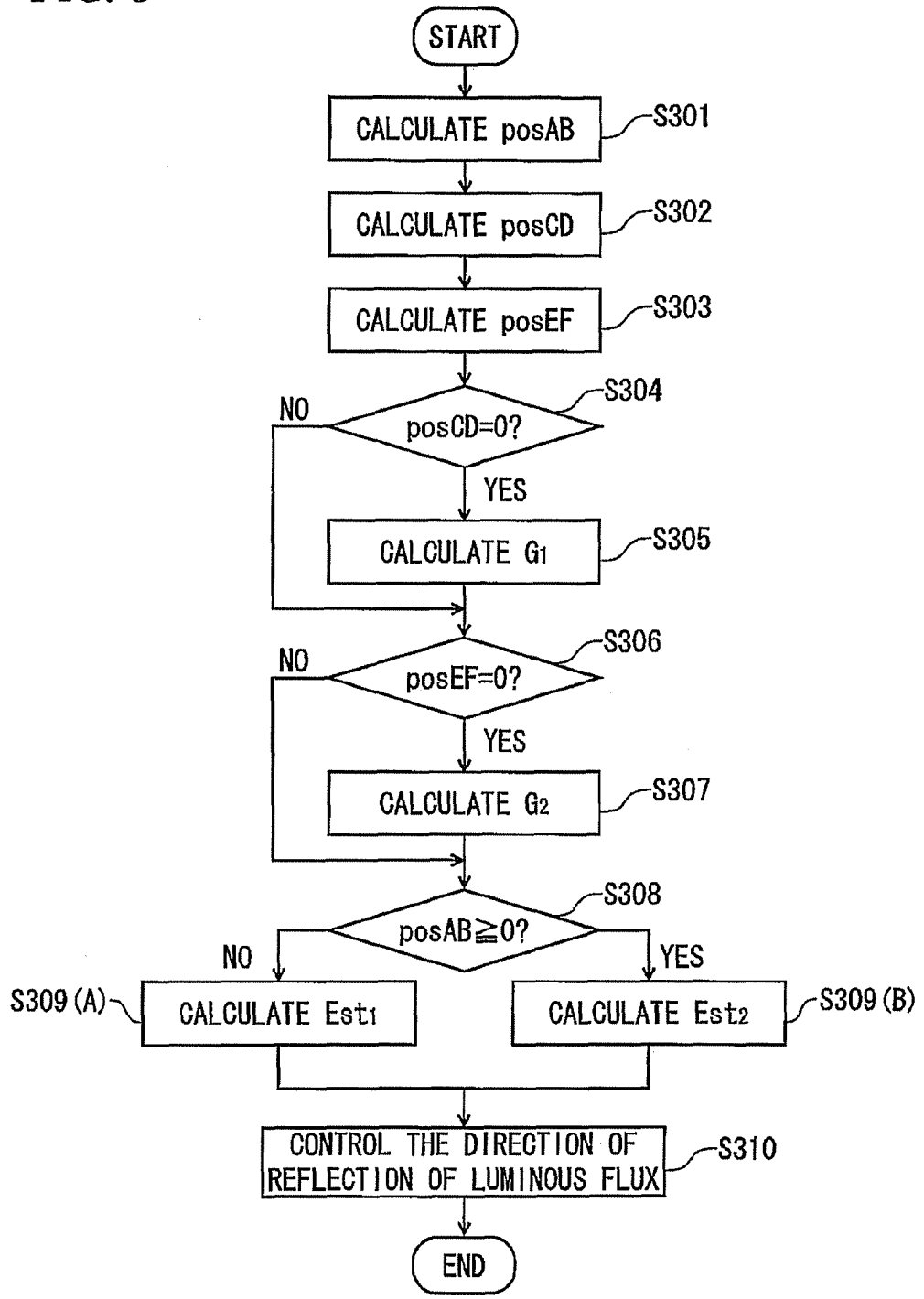
FIG. 5 illustrates a method for controlling the display device of FIG. 4.

FIG. 5 illustrates a control method of the display device according to Embodiment 2. The control method shown in FIG. 5 starts at a state where an initial value of $G_1$ and an initial value of $G_2$ are given to the controller 620 in advance in the manufacturing stage of the display device 10. Or the control method starts at a state where the viewer 100 first moves the head 101 to positions satisfying posCD=0 and posEF=0 respectively and makes the controller 620 calculate an initial value of $G_1$ and an initial value of $G_2$ at the time of start of use of the display device 10.

As shown in FIG. 5, in the control method of the display device according to Embodiment 2, posAB is calculated according to the expression 1 by using the output voltage value of the distance sensor 613a and the output voltage value of the distance sensor 613b (step S301). posCD is calculated according to the expression 2 by using the output voltage value of the distance sensor 613c and the output voltage value of the distance sensor 613d (step S302). And, posEF is calculated according to the expression 5 by using the output voltage value of the distance sensor 613e and the output voltage value of the distance sensor 613f (step S303). The step S301, the step S302 and the step S303 are repeated in accordance with sampling time. The step S301, the step S302 and the step S303 may be in random order.

Then, determination is made as to whether the value of posCD is a value equal to zero or not (step S303). When determination is made that the value of posCD is a value equal to zero, the first coefficient $G_1$ is calculated according to the expression 3 (step S305). When determination is made that the value of posCD is not a value equal to zero, the value of $G_1$ is held without execution of the step S305. For example, the initially set value or previously calculated value of $G_1$ is used or the value of $G_2$ is used instead.

Determination is made as to whether the value of posEF is a value equal to zero or not (step S306). When determination is made that the value of posEF is a value equal to zero, the second coefficient $G_2$ is calculated according to the expression 6 (step S307). When determination is made that the value of posEF is not a value equal to zero, the value of $G_2$ is held without execution of the step S307. For example, the initially set value or previously calculated value of $G_2$ is used or the value of $G_1$ is used instead.

Then, determination is made as to whether posAB satisfies posAB≥0 or not (step S308). When determination is made that posAB satisfies posAB≥0, $Est_2$ is calculated according to the expression 7 (step S309(B)). When determination is made that posAB does not satisfy posAB≥0, $Est_1$ is calculated according to the expression 4 (step S309(A)).

Successively, the direction of reflection of the luminous flux 112 is controlled based on a result of the step S309(A) or the step S309(B).

According to this method, the processing step of converting each output voltage value into the distance to the head 101 of the viewer 100 can be omitted so that processing cost can be reduced. Because the position of the head 101 of the viewer 100 is determined according to the expressions 4 and 7, measurement can be performed without correction due to temperature, individual difference, etc. so that robustness is improved.

By using the expressions 4 and 7, the position of the head 101 of the viewer 100 can be measured with higher accuracy compared with the control method shown in FIG. 3.

Although there is exemplified the case where the first distance sensor pair 614 is used for measurement of the position of the head 101 of the viewer 100, the second distance sensor pair 615 or the third distance sensor pair 616 can be used for measurement of the position of the head 101 of the viewer 100 if necessary.

For example, in the case where the head 101 of the viewer 100 is located at a distance of $\Delta x_1$ or longer on the right side of the first midpoint 514, $Est_3$ is determined as the position of the head 101 of the viewer 100 in accordance with the expression 8. $Est_3$ is an estimated value corresponding to the relative distance between the geometrical barycenter of the head 101 of the viewer 100 and the second line 515a.

[Numeral 7]

$$Est_3 = G_1 \frac{V_c - V_d}{V_c + V_d} + \Delta x_1 \quad \text{(Expression 8)}$$

In the case where the head 101 of the viewer 100 is located at a distance of $\Delta x_2$ or longer on the left side of the first midpoint 514, $Est_4$ is determined as the position of the head 101 of the viewer 100 in accordance with the expression 9. $Est_4$ is an estimated value corresponding to the relative distance between the geometrical barycenter of the head 101 of the viewer 100 and the third line 516a.

[Numeral 8]

$$Est_4 = G_2 \frac{V_e - V_f}{V_e + V_f} - \Delta x_2 \quad \text{(Expression 9)}$$

In this manner, even when the head 101 of the viewer 100 moves largely, the position thereof can be measured with high accuracy.

Although the embodiments are exemplified, the invention is not limited thereto. For example, although the head detector 612 described above uses two pairs or three pairs of distance sensors for measuring the position of the head 101 of the viewer 100, the number of distance sensor pairs can be increased to four pairs or five pairs. In this manner, the measurable range can be enlarged.

The measurement of the position of the head 101 of the viewer 100 is calculated by use of the expressions 4 and 7 to normalize the difference between the output voltage values of each distance sensor pair. However, another method than this calculation method may be included in the scope of the invention as long as the difference between the output voltage values of each distance sensor pair can be used as represented by the expression 10 for obtaining the same effect as that of the invention.

[Numeral 9]

$$posAB' = \frac{V_a - V_b}{V_a \times V_b} \quad \text{(Expression 10)}$$

Any specific configuration of components for realizing the display device and the control method therefor will fall within the scope of the invention as long as they include the same function and the same advantages.

Any display device and control method therefor realized by suitably adapting the commonly-known technique to the above embodiments will fall within the scope of the invention as long as they include the same concepts.

Various modifications to be made by the skilled person within the spirit of the invention will fall within the scope of the invention.

The invention claimed is:

1. A display device, comprising:
 a luminous flux generator which generates luminous flux including image information;
 a reflector plate which reflects the luminous flux generated by the luminous flux generator toward one eye of a viewer;
 a driver which drives the reflector plate to thereby adjust a direction of the luminous flux;
 a head detector which includes:
  a first pair of distance sensors which are disposed at predetermined positions and output first measurement values corresponding to distances therefrom to the head of the viewer; and
  a second pair of distance sensors which are disposed at positions different from the predetermined positions, and output second measurement values corresponding to distances therefrom to the head of the viewer; and
 a controller which:
  calculates a first calculation value and a second calculation value based on the first measurement values and the second measurement values respectively, determines a coefficient based on the first calculation value which is obtained at a time when the second calculation values becomes zero, calculates a relative position of the head of the viewer based on the first calculation value and the coefficient, and controls the driver to drive the reflector plate based on the calculated relative position.

2. The display device of claim 1,
wherein the controller
calculates a difference between output voltages of the first pair of distance sensors,
calculates the coefficient by using a distance between a midpoint of the first pair of distance sensors and a midpoint of the second pair of distance sensors and a difference between output voltages of the second pair of distance sensors, and
controls a direction or position of the reflector plate based on the difference between the output voltages of the first pair of distance sensors and the coefficient.

3. The display device of claim 2,
wherein the luminous flux generator includes:
a light source;
a limiter which limits a direction of movement of the luminous flux from the light source;
a diffuser which diffuses the luminous flux;
an image device which adds image information to the luminous flux diffused by the diffuser;
a first lens which converges the luminous flux having passed through the image device;
an aperture member which controls an angle of divergence of the luminous flux having passed through the first lens; and
a second lens which converges the luminous flux having passed through the aperture member.

4. The display device of claim 1, wherein the image information of the luminous flux includes driving information.

5. The display device of claim 1, further comprising a diffuser that diffuses the luminous flux.

6. The display device of claim 1, wherein each of the first pair of distance sensors and the second pair of distance sensors comprise a light emitting element and a light receiving element.

7. The display device of claim 6, wherein a distance to the head of the viewer is determined based on a comparison of light received at the light receiving element to light emitted by the light emitting element.

8. The display device of claim 1, wherein the first pair of distance sensors and the second pair of distance sensors are disposed on a line.

9. A method for controlling a display device, comprising:
generating luminous flux including image information;
reflecting the generated luminous flux toward one eye of a viewer;
measuring a first measurement value representative of a first distance from a first pair of distance sensors to a head of a viewer;
measuring a second measurement value representative of a second distance from a second pair of distance sensors to the head of the viewer, wherein the second pair of distance sensors are at a different location than the first pair of distance sensors;
calculating a first calculation value and a second calculation value based on the first measurement value and the second measurement value respectively;
determining a coefficient based on the first calculation value being obtained at a time when the second calculation value becomes zero;
determining a relative position of the head of the viewer based on the first calculation value and the coefficient; and
driving a reflector plate to adjust a direction of the luminous flux to the determined relative position of the head of the viewer.

10. The method of claim 9, further comprising:
calculating a difference between output voltages of the first pair of distance sensors,
calculating the coefficient by using a distance between a midpoint of the first pair of distance sensors and a midpoint of the second pair of distance sensors and a difference between output voltages of the second pair of distance sensors, and
controlling the direction of the reflection based on the difference between the output voltages of the first pair of distance sensors and the coefficient.

* * * * *